F. BEATTIE.
TESTER FOR ELECTRIC BLASTING FUSES.
APPLICATION FILED FEB. 23, 1909.
956,877.
Patented May 3, 1910.
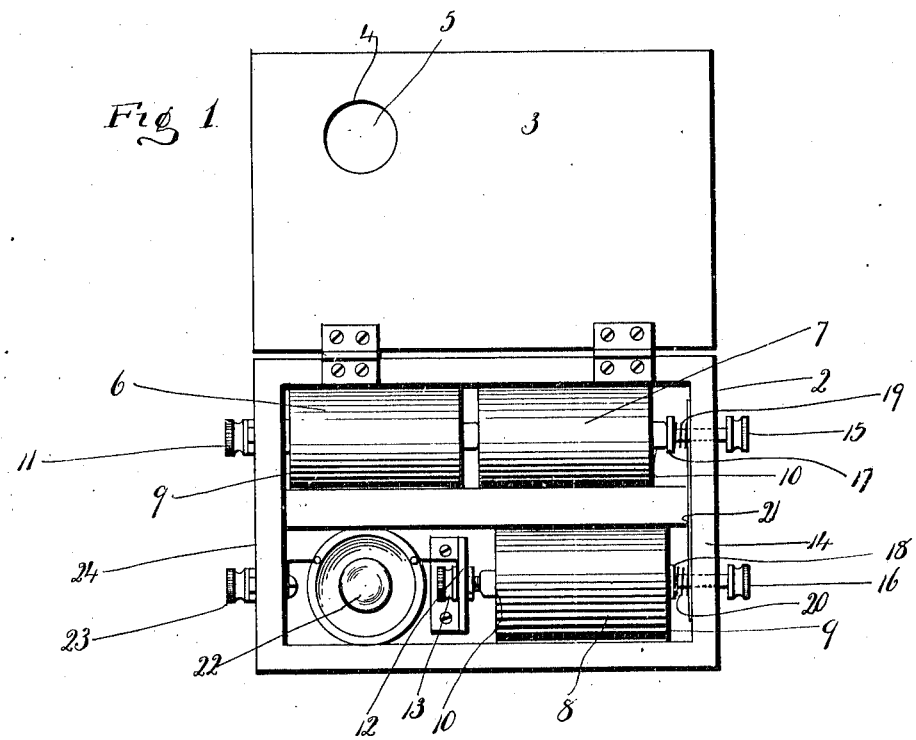
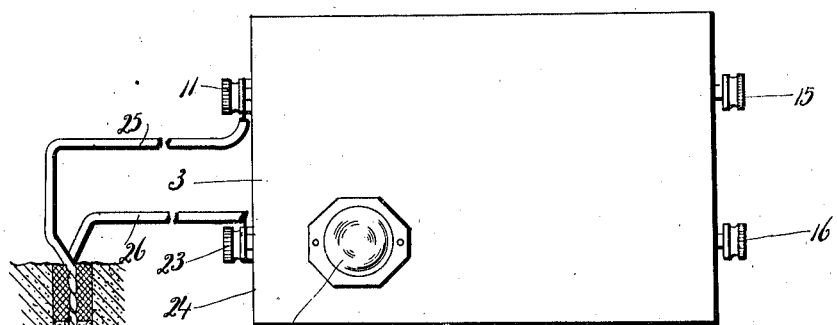
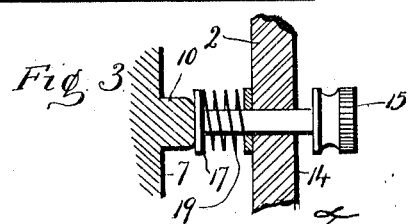

UNITED STATES PATENT OFFICE.

FRANCIS BEATTIE, OF LEETE ISLAND, CONNECTICUT.

TESTER FOR ELECTRIC BLASTING-FUSES.

956,877. Specification of Letters Patent. Patented May 3, 1910.

Application filed February 23, 1909. Serial No. 479,424.

*To all whom it may concern:*

Be it known that I, FRANCIS BEATTIE, a citizen of the United States, residing at Leete Island, in the county of New Haven and State of Connecticut, have invented a new and useful Improvement in Testers for Electric Blasting-Fuses; and I do hereby declare the following, when taken in connection with the accompanying drawings and the numerals of reference marked thereon, to be a full, clear, and exact description of the same, and which said drawings constitute part of this specification, and represent, in—

Figure 1 a top or plan view of a tester for electric blasting fuses shown partly in section, and with the cover open. Fig. 2 a top or plan view with the cover closed, and shown connected with an electric blasting fuse. Fig. 3 a broken sectional view showing means for holding one of the battery cells in position.

This invention relates to an improvement in testers for electric blasting fuses.

In blasting with electric fuses if the blast in each chamber does not go off, there is no way to tell whether it was because the wires between the battery and the powder were crossed, or whether owing to a fissure in the rock the powder has run.

The object of this invention is to provide a testing device including an electric light by which these fuses may be tested, and so that it can be determined whether the difficulty is with the wire or not; and the invention consists in the construction hereinafter described and particularly recited in the claim.

In carrying out my invention I employ a box 2 provided with a cover 3 having a sight opening 4 preferably closed by magnifying glass 5. In the box for convenience I employ batteries which come in short cells and use three of such cells 6, 7 and 8. These cells each have a flat base 9 and a plug or point 10. The cells 6 and 7 are arranged in line so that the plug of one bears against the base of the other. In the end of the box adjacent to the end of the cell 6 is a screw post 11 with which the cell 6 is in contact. Mounted near the center of the box is a bracket 12 carrying a screw post 13 against which the end of the cell 8 rests. Mounted in the end 14 of the box are two plungers 15 and 16. These plungers have washers 17 and 18 which bear against the point 10 of the cell 7 and the end of cell 8 and are held in contact therewith by spiral springs 19 and 20, and the plugs are connected together by a metal plate 21 so that the cells are connected in the same circuit. These spring plungers permit the ready removal of the several cells when required. The post 13 is connected with an incandescent light bulb 22 and this light bulb is connected with a binding post 23 mounted in the end 24 of the box. In order to test the fuse the wires 25 and 26 thereof are coupled respectively with the binding posts 11 and 23, and if when connected the incandescent bulb is lighted it shows immediately that the cap is perfect; or if there is no light, it indicates that the cap is imperfect or has been exploded.

This device is very simple in construction and so small that it may be readily carried about and the battery cells replaced at will; and the current passing through the incandescent bulb is of such low amperage that it will not explode the cap.

I claim:—

A tester for electric blasting fuses comprising a box, a bracket in said box, a battery cell between said bracket and one end of the box, an electric lamp between said bracket and the other end of said box, a pair of batteries opposite said light and battery, connections for the batteries at one end of the box, and binding posts at the opposite end in connection with said light and batteries, whereby when the circuit is closed, said lamp will be lighted and the electric current regulated.

In testimony whereof, I have signed this specification in the presence of two subscribing witnesses.

FRANCIS BEATTIE.

Witnesses:
FREDERIC C. EARLE,
CLARA L. WEED.